United States Patent [19]
Lee et al.

[11] Patent Number: 6,091,031
[45] Date of Patent: Jul. 18, 2000

[54] PORTABLE INFORMATION TERMINAL AND AN ACTIVATING METHOD THEREOF

[75] Inventors: Je-hyung Lee, Yongin; Jae-seong Oh, Seongnam; Jin-chul Lee, Anyang, all of Rep. of Korea

[73] Assignee: Samsung Electronics Co., Ltd., Kyungki-do, Rep. of Korea

[21] Appl. No.: 09/019,738

[22] Filed: Feb. 6, 1998

[30] Foreign Application Priority Data

Apr. 11, 1997 [KR] Rep. of Korea ................. 97-13423

[51] Int. Cl.⁷ .................................................. G08C 21/00
[52] U.S. Cl. ................................. 178/18.01; 178/18.03; 178/18.05; 178/18.06; 178/18.07; 178/18.1
[58] Field of Search ......................... 345/169, 173, 345/174, 175, 176, 177, 178, 179; 178/18.01, 18.02, 18.04, 18.05, 18.03, 18.06, 18.07, 18.1; 379/61

[56] References Cited

U.S. PATENT DOCUMENTS

| | | | |
|---|---|---|---|
| 5,451,724 | 9/1995 | Nakazawa et al. | 345/173 |
| 5,584,054 | 12/1996 | Tyneski et al. | 379/61 |
| 5,615,384 | 3/1997 | Allard et al. | 345/173 |
| 5,854,451 | 12/1998 | Miyazaki et al. | 345/173 |

FOREIGN PATENT DOCUMENTS

| | | | |
|---|---|---|---|
| 0 626 633 | 11/1994 | European Pat. Off. | G06F 1/32 |
| 1-113823 | 5/1989 | Japan | G06F 3/03 |
| 5-127827 | 5/1993 | Japan | G06F 3/033 |
| 7-44308 | 2/1995 | Japan . | |
| 8-320745 | 12/1996 | Japan . | |
| 9-44293 | 2/1997 | Japan . | |
| 2 320 591 | 6/1998 | United Kingdom | G06F 1/32 |

*Primary Examiner*—Vijay Shankar
*Attorney, Agent, or Firm*—Sughrue, Mion, Zinn, Macpeak & Seas, PLLC

[57] ABSTRACT

A portable information terminal is provided. The terminal includes a touch screen panel having an activation area and an activating unit. The activation unit activates the portable information terminal when the terminal is turned off and an activating position on the activation area is pressed for a predetermined time. The activating unit contains a press position sensor, a press timer, and a controller. The press position sensor senses if a panel position on touch screen panel is pressed and determines a location of the panel position on the touch screen panel to generate corresponding press position data. The press timer determines if the panel position is pressed for at least a predetermined time to generate corresponding press time data. The controller inputs the press position data and the press time data, determines if the panel position is located within the activation area based on the press position data, and controls power supplied to various components of the portable information terminal such that the power is supplied when the panel position is located within the activation area and when the activation area is pressed for at least the predetermined time.

13 Claims, 5 Drawing Sheets

PORTABLE INFORMATION TERMINAL AND AN ACTIVATING METHOD THEREOF

FIELD OF THE INVENTION

The present invention relates to a portable information terminal. More particularly, the present invention relates to a portable information terminal employing a touch screen panel and relates to an activating method thereof.

BACKGROUND OF THE INVENTION

In portable information terminals, software switching is used more often than hardware switching. When using software switching, a system is driven by pressing an device (e.g. a pen) onto a predetermined area of a touch screen panel ("TSP") which covers a liquid crystal screen and a program selection screen. When the system is to be turned off, a "turn-off" command is applied by pressing the pen on a certain area of the touch screen panel.

A conventional portable information terminal using software switching may contain one of two different activation areas on which a pen may be pressed to activate the terminal. The first activation area may be an icon image occupying a small area in the program selection area of the touch screen panel. The second activation area may correspond to the entire touch screen panel.

With respect to the first activation area, attention must be paid to ensure accurate selection since the activation area is small. With respect to the second activation area, a touch screen panel protection cover can inadvertently touch the touch screen panel when the portable information terminal is being transported in a briefcase, bag, etc. Thus, a microcontroller in the terminal may mistakenly assume that the pen is continuously pressed on the touch screen panel and the terminal may be erroneously turned on. As a result, power is consumed unnecessarily.

SUMMARY OF THE INVENTION

It is an object of the present invention to provide a portable information terminal in which a program selection area of a touch screen panel acts as a system activation area, and a system is activated only after pressing the activation area for a predetermined time.

It is another object of the present invention to provide a activating method of the portable information terminal.

To achieve one of the above objects, a portable information terminal is provided. The terminal comprises: a touch screen panel having an activation area; and an activating unit which activates said portable information terminal when said portable information terminal is turned off and an activating position on said activation area is pressed for a predetermined time. Also, the activating unit comprises a press position sensor which senses if a panel position on touch screen panel is pressed and determines a location of said panel position on said touch screen panel to generate corresponding press position data; a press timer which is coupled to said press position sensor and determines if said panel position is pressed for at least a predetermined time to generate corresponding press time data; and a controller, which inputs said press position data and said press time data, determines if said panel position is located within said activation area based on said press position data, and controls power supplied to various components of said portable information terminal such that said power is supplied when said panel position is located within said activation area and when said activation area is pressed for at least said predetermined time.

To achieve another one of the above objects, a method for activating a portable information terminal having a touch screen panel having an activation area is provided. The method comprises the steps of: (a) pressing a panel position of said touch screen panel when said portable information terminal is in a stopping mode; (b) determining said panel position where touch screen panel is pressed; (c) generating press information indicating that said panel position is pressed and indicating a location of said panel position when said touch screen panel is pressed; (d) determining if said panel position is located within said activation area of said touch screen panel based on said press information; (e) determining whether said panel position is pressed for longer than a predetermined time; and (f) supplying power to various components of said portable information terminal when said panel position is located within said activation area and is pressed for longer than said predetermined time.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT(S)

The following description of the preferred embodiments discloses specific configurations. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various features, structures, and processes of the present invention which would have been known to one skilled in the art are omitted for the sake of clarity and brevity.

Figure 1A:
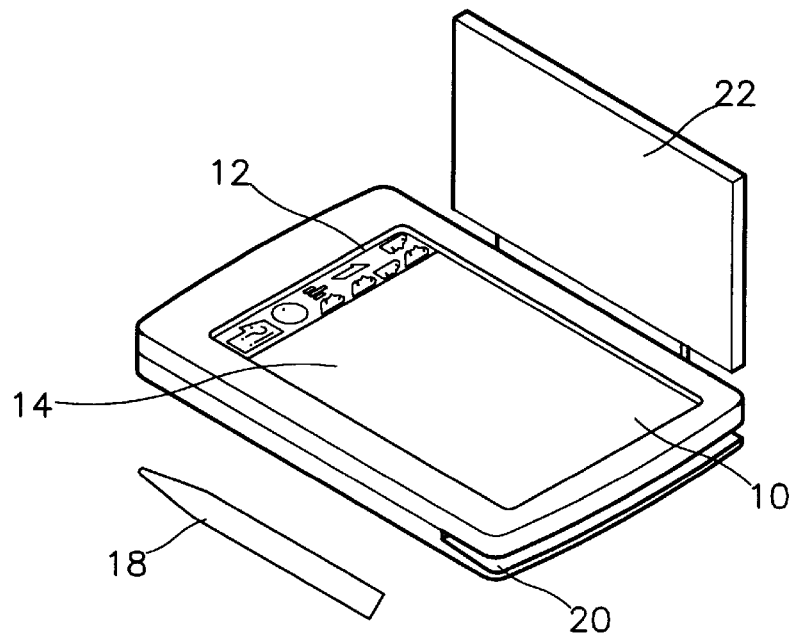
FIG. 1A shows a portable information terminal according to the present invention.

As shown in FIG. 1A, the portable information terminal includes a liquid crystal screen 10, a program selection screen 12, a touch screen panel 14, a pen 18, a pen holder 20, and a protective cover 22. The program selection screen 12 is adjacent to the liquid crystal screen 10, and the touch screen panel 14 covers the liquid crystal screen 10 and the program selection screen 12. The pen 18 is used to select a desired position on the touch screen panel 14, and the pen holder 20 holds the pen 18 when it is not being used. The protective cover 22 covers the touch screen panel 14 and protects it when the system is not in use.

Figure 1B:
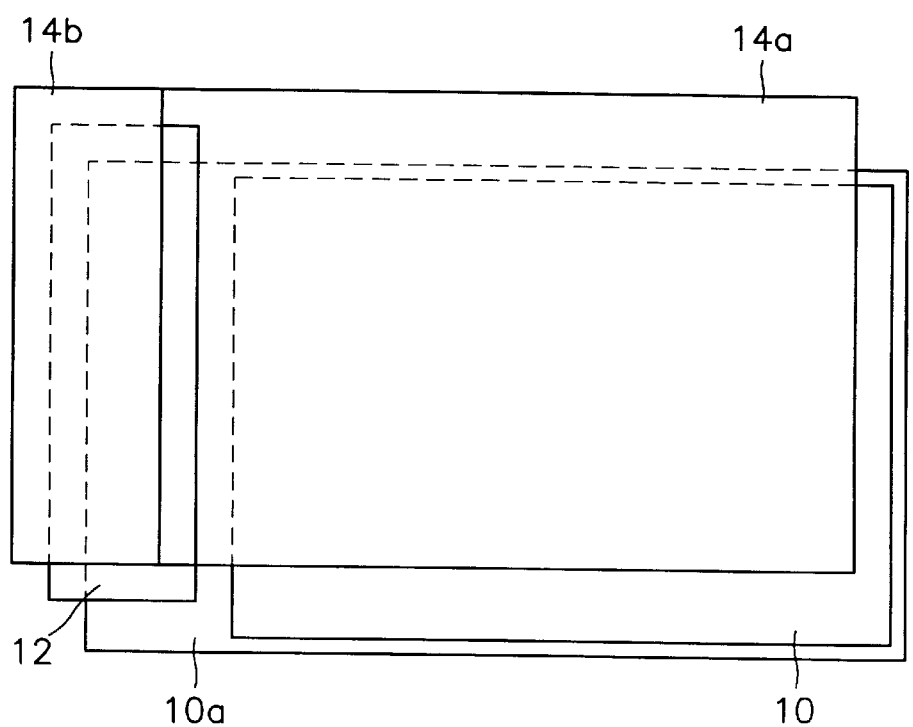
FIG. 1B is a detailed view showing a liquid crystal screen, a program selection screen, and a touch screen panel shown in FIG. 1A.

FIG. 1B is an exploded view which illustrates the liquid crystal screen 10, the program selection screen 12, and the touch screen panel 14 in more detail. The liquid crystal screen 10 and the program selection screen 12 are installed on a liquid crystal screen frame 10a, and a program selection icon sticker is attached to the program selection screen 12. Also, the icon could be a liquid crystal or other image displayed on the screen 12. The touch screen panel 14 is installed such that it covers the icon sticker of the program selection screen 12 and the liquid crystal screen 10. The touch screen panel 14 is divided into a liquid crystal screen area 14a covering the liquid crystal screen 10 and a program selection area 14b covering the program selection screen 12.

In the portable information terminal of the present invention, the program selection area 14b of the touch screen panel acts as a system activation area when the system is in a stopping mode and acts as a program selection area when the system is in a normal mode. In the normal mode, a plurality of icon stickers indicating respective operations of the terminal may be attached to the program selection screen 12, and a user may select and execute a program to perform one of the operations by pressing a position on the touch screen panel above the corresponding icon.

Figure 2:
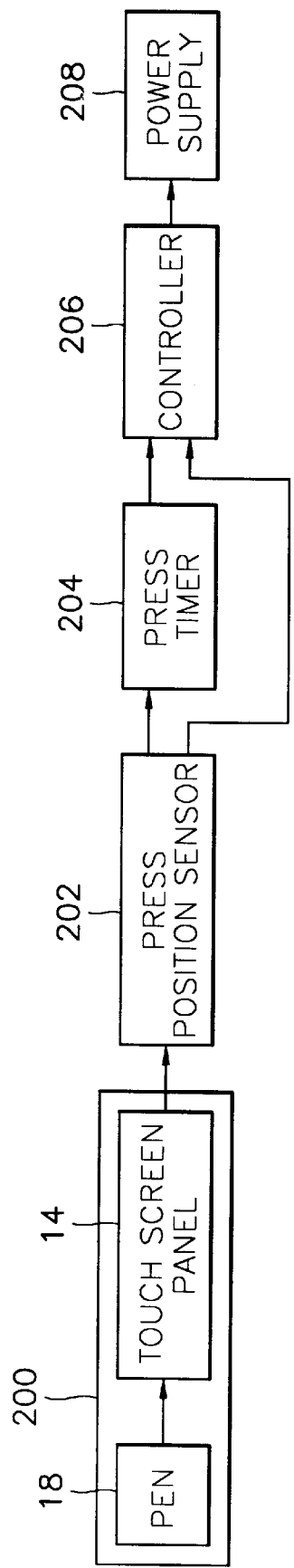
FIG. 2 is a block diagram showing an activating apparatus in the portable information terminal shown in FIG. 1.

FIG. 2 is a block diagram of an activating apparatus contained in the portable information terminal shown in FIGS. 1A and 1B. The activating apparatus includes an input unit 200, a press position sensor 202, a press timer 204, a controller 206, and a power supply 208.

The input unit 200 comprises the pen 18 and the touch screen panel 14 and outputs a contact signal when the pen 18 touches the panel 14. The press position sensor 202 senses when the screen panel 14 is pressed based on the contact signal and outputs a corresponding depression signal. The press timer 204 inputs the depression signal and determines whether or not the pressure sensed by the press position sensor 202 lasts for more than a predetermined time. The controller 206 controls the power supply 208 and instructs the power supply 208 to supply power to the system when the press position sensor 202 indicates that the system activation area of the touch screen panel is being pressed and the press timer 204 indicates that the activation area has been pressed for more than the predetermined time.

The operation of the activating apparatus shown in FIG. 2 is as follows. When a user presses a point on the touch screen panel 14 using the pen 18, the press position sensor 202 senses whether the coordinate values of the pressed point are within the activation area of the touch screen panel 14. If the pressed point is within the activation area, the press timer 204 determines whether or not the point has been pressed longer than a predetermined time. If the point is within the activation area and has been pressed longer than such time, the controller 206 controls the power supply 208 so that power is supplied to the system.

Figure 3:
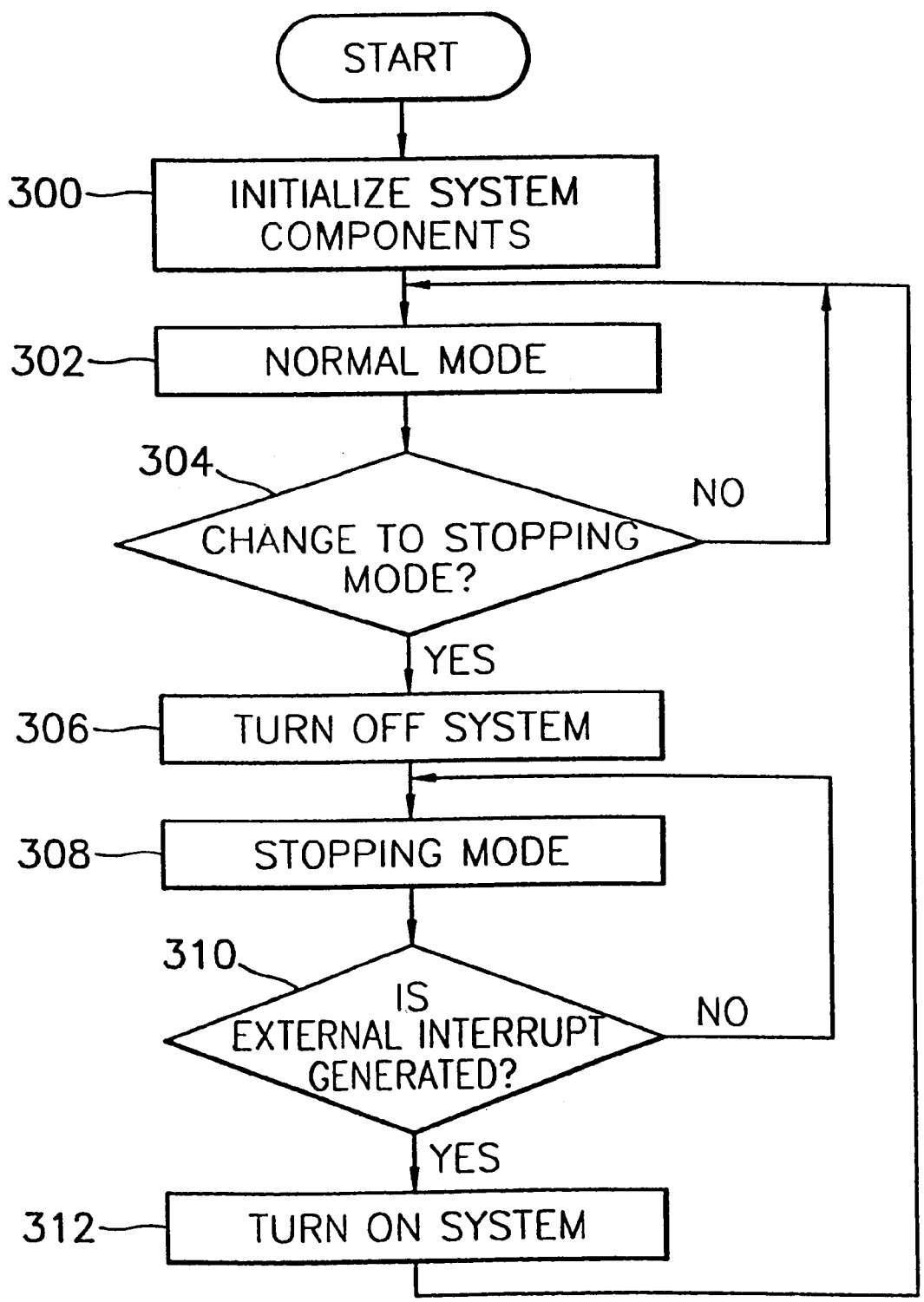
FIG. 3 is a flow chart describing a process of switching between a normal mode and a stopping mode in the portable information terminal according to the present invention.

FIG. 3 is a flow chart illustrating a procedure for turning on the portable information terminal. When the system is initially turned on, various components of the system are initialized (step 300), and the system operates in a normal mode (step 302). In the normal mode, the user can select various operations by pressing the pen 18 on a corresponding icon in the program selection area. When the system is operating in the normal mode, it determines whether or not it should be switched to a stopping mode (step 304). The system may be switched to the stopping mode when one or more conditions are satisfied. For example, the system may be placed in a stopping mode when a user selects a system shutdown menu item, when a predetermined time has passed without any input, and/or when other critical situations occur such as the rapid reduction of a battery voltage. When the system determines to switch to the stopping mode, the system is immediately turned off (step 306). In such case, the system is switched to a power saving mode in which the liquid crystal screen 10 is turned off and the power supplied to the various components is turned off, and the stopping mode is entered (step 308).

After the system is in the stopping mode, it determines if an external interrupt is generated (step 310). When the external interrupt is generated, the system is turned on (step 312) and the normal mode is resumed (step 302). In the normal mode, the components of the system are driven as required, and a user can use the system. On the other hand, as long as no external interrupt has been applied, the stopping mode is maintained (step 308).

The external interrupt described in conjunction with FIG. 3 may correspond to the pen interrupt which is generated when the pen 18 is pressed against the activation area. The method of processing the pen interrupt will be described with reference to FIG. 4.

When the system is in the stopping mode, a user generates the pen interrupt by pressing the activation area of the touch screen panel 14 with the pen 18 (step 400). When the pen interrupt is generated, the coordinate values at which the pen 18 is pressed are obtained (step 402). Then, activation information identifying that the pen was pressed against the touch screen panel 14 and identifying the coordinate values at which the pen was pressed are provided to the controller 206 (step 404).

Figure 4:
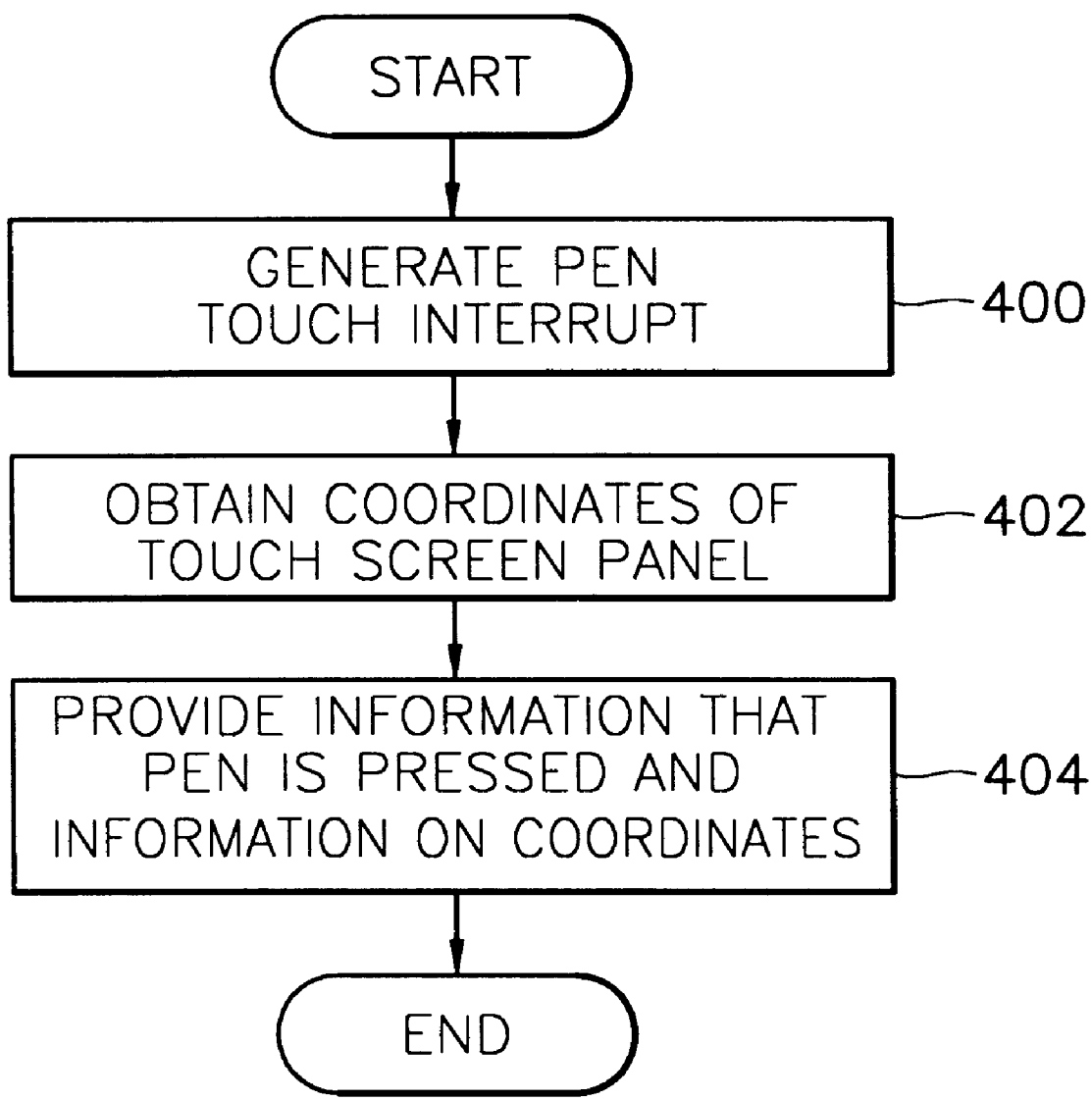
FIG. 4 is a flow chart describing the process of a pen interrupt which is an embodiment of the generation of an external interrupt shown in FIG. 3.
Figure 5:
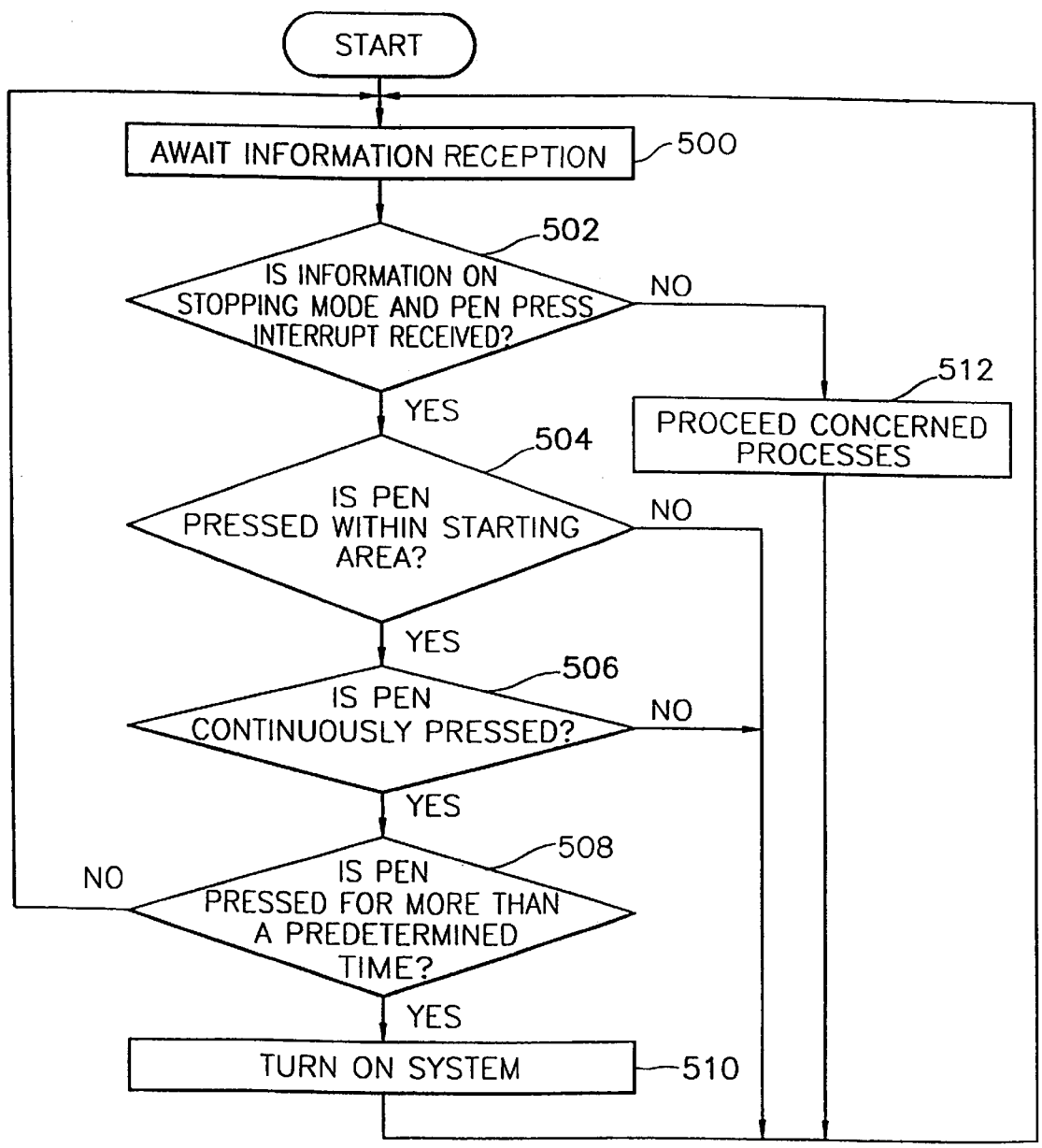
FIG. 5 is a flow chart describing the control of a power supply using information obtained from the process shown in the flow chart of FIG. 4.

FIG. 5 is a flow chart describing the manner in which the power supply 208 is controlled based on the activation information obtained from the process described in FIG. 4. First, the controller 206 receives information (step 500) and determines if the information is the activation information which indicates that the pen 18 has been pressed against the touch screen panel 14 during the stopping mode (step 502). If the received information is not the activation information, the system executes another procedure (step 512). Alternatively, the system may disregard the information and wait until the activation information is received. If the received information is the activation information, the system determines whether or not the coordinates at which the pen is pressed are within the activation area of the touch screen panel 14 (step 504) and whether or not the pen is continuously pressed against such area (step 506). If so, the system determines whether or not the time during which the touch screen panel 14 is pressed is longer than a predetermined time (step 508). If the pen 18 has been pressed against the activation area for longer than the predetermined time, the system is reactivated by instructing the power supply 208 to turn on the system (step 510). On the other hand, when the pen is not pressed against the activation area (step 504), when the pen is not continuously pressed against the touch screen panel 14 (step 506) or when the pen is not pressed against the activation area for the predetermined time, the process waits to receive information (step 500).

As described above, the system is activated when the pen 18 is pressed against the activation area for a predetermined amount of time. However, the system may be alternatively activated when the pen 18 is pressed against any portion of the touch screen panel 14 for the predetermined time.

According to the present invention, a selection for activating the system can be easily made since all of the program selection area of the touch screen panel may be used as the system activation area. Also, unnecessary power consumption can be prevented since the system is designed not to be turned on unless desired by the user because power is supplied to the system only when the activation area of the touch screen panel is pressed for more than a predetermined time.

Obviously, the embodiments described above are merely illustrative, and modifications of such embodiments may occur to those skilled in the art. Accordingly, this invention is not to be regarded as limited to the embodiments disclosed herein, but is to be limited only as defined by the appended claims.

What is claimed is:

1. A portable information terminal, comprising:
   a liquid crystal screen;
   a program selection screen containing icons for selecting a program to be executed, a touch screen panel having a liquid crystal screen area covering said liquid crystal screen and a program selection area covering said program selection screen; and
   an activating unit which activates said portable information terminal when said portable information terminal is turned off and a position on said program selection area is pressed for a predetermined time,
   wherein said activating unit further comprises:
   a press position sensor which senses if said position on said program selection area is pressed and determines a location of said position on said program selection area to generate corresponding press position data;
   a press timer, coupled to said press position sensor, which receives said press position data, and which determines if said position is pressed for at least a predetermined time to generate corresponding press time data; and
   a controller which receives said press position data and said press time data and controls power supplied to various components of said portable information terminal such that said power is supplied only when said program selection area is pressed for at least said predetermined time.

2. A method for activating a portable information terminal having a liquid crystal screen, a program selection screen containing icons for selecting a program, and a touch screen panel having a liquid crystal screen area covering said liquid crystal screen and a program selection area covering said program selection screen, comprising the steps of:
   generating an interrupt signal when a position of said program selection area of said touch screen panel is pressed and said portable information terminal is in a stopping mode;
   determining said position where said program selection area is pressed and generating press information indicating that said position is pressed and indicating the location of said position when said interrupt signal is generated;
   determining if said position is located within said program selection area based on said press information;
   determining whether said position is pressed for longer than a predetermined time; and
   supplying power to various components of said portable information terminal when said position is located within said program selection area and is pressed for longer than said predetermined time.

3. A portable information terminal, comprising:
   a touch screen panel having an activation area; and
   an activating unit which activates said portable information terminal when said portable information terminal is turned off and an activating position on said activation area is pressed for a predetermined time,
   wherein said activating unit further comprises:
   a press position sensor which senses if a panel position on touch screen panel is pressed and determines a location of said panel position on said touch screen panel to generate corresponding press position data;
   a press timer, coupled to said press position sensor and determines if said panel position is pressed for at least a predetermined time to generate corresponding press time data; and
   a controller, which receives said press position data and said press time data, determines if said panel position is located within said activation area based on said press position data, and controls power supplied to various components of said portable information terminal such that said power is supplied when said panel position is located within said activation area and when said activation area is pressed for at least said predetermined time.

4. The portable information terminal as claimed in claim 3, further comprising:
   a liquid crystal screen;
   a program selection screen containing icons for selecting a program to be executed,
   wherein said touch screen panel comprises a liquid crystal screen area which overlays said liquid crystal screen and wherein said activation area of said touch screen panel overlays said program selection area.

5. The portable information terminal as claimed in claim 3, wherein said activation area constitutes substantially all of said touch screen panel.

6. The portable information terminal as claimed in claim 3, wherein said controller controls power supplied to said various components of said portable information terminal such that said power is supplied only when said panel position is located within said activation area and when said activation area is pressed for at least said predetermined time.

7. The portable information terminal as claimed in claim 3, wherein said controller prevents power from being supplied to said various components when said panel position is not continuously pressed for more than said predetermined time.

8. A method for activating a portable information terminal having a touch screen panel with an activation area, comprising the steps of:
   (a) pressing a panel position of said touch screen panel when said portable information terminal is in a stopping mode;
   (b) determining said panel position where said touch screen panel is pressed;
   (c) generating press information indicating that said panel position is pressed and indicating a location of said panel position when said touch screen panel is pressed;
   (d) determining if said panel position is located within said activation area of said touch screen panel based on said press information;
   (e) determining whether said panel position is pressed for longer than a predetermined time; and
   (f) supplying power to various components of said portable information terminal when said panel position is located within said activation area and is pressed for longer than said predetermined time.

9. The method as claimed in claim 8, wherein said portable information terminal comprises a liquid crystal screen and a program selection screen containing icons for selecting a program to be executed, wherein said touch screen panel comprises a liquid crystal screen area which overlays said liquid crystal screen, and wherein said activation area of said touch screen panel overlays said program selection area.

10. The method as claimed in claim 8, wherein said activation area constitutes substantially all of said touch screen panel.

11. The method as claimed in claim 8, wherein said step (f) further comprises the step of:

(f1) supplying power to said various components of said portable information terminal only when said panel position is located within said activation area and is pressed for longer than said predetermined time.

12. The method as claimed in claim 8, further comprising the step of:

(g) preventing power from being supplied to said various components when said panel position is not continuously pressed for more than said predetermined time.

13. A portable information terminal, comprising:

a liquid crystal screen;

a program selection screen containing icons for selecting a program to be executed, a touch screen panel having a liquid crystal screen area covering said liquid crystal screen and a program selection area covering said program selection screen; and an activating unit which activates said portable information terminal when said portable information terminal is turned off and a position on said program selection area is pressed for a predetermined time.

wherein said activating unit further comprises:

a press position sensor which senses if said position on said program selection area is pressed and generates corresponding press position data;

a press timer, coupled to said press position sensor, which receives said press position data, and generates corresponding press time data; and a controller which receives said press position data and said press time data and controls power supplied to various components of said portable information terminal when said program selection area is pressed for at least said predetermined time.

* * * * *